(12) United States Patent
Song et al.

(10) Patent No.: US 12,421,656 B2
(45) Date of Patent: Sep. 23, 2025

(54) METHOD FOR MANUFACTURING ARTIFICIAL LEATHER SEAT COVERING

(71) Applicant: HYUNDAI TRANSYS INCORPORATED, Seosan-si (KR)

(72) Inventors: Jun Ho Song, Hwaseong-si (KR); Hye Rin Choi, Hwaseong-si (KR); Gu Hwan Kim, Busan (KR); Tae Gyun Baek, Gimhae-si (KR); Byung Joo Jang, Busan (KR); Man Young Kim, Busan (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/893,395

(22) Filed: Aug. 23, 2022

(65) Prior Publication Data

US 2023/0098077 A1    Mar. 30, 2023

(30) Foreign Application Priority Data

Aug. 24, 2021    (KR) .................. 10-2021-0111399

(51) Int. Cl.
*B32B 5/02* (2006.01)
*B32B 7/12* (2006.01)
(Continued)

(52) U.S. Cl.
CPC .............. *D06N 3/128* (2013.01); *B32B 5/02* (2013.01); *B32B 7/12* (2013.01); *C09D 183/04* (2013.01);
(Continued)

(58) Field of Classification Search
CPC ......... B32B 2601/00; B32B 5/02; B32B 7/12; B32B 2255/02; B32B 2255/26;
(Continued)

(56) References Cited

FOREIGN PATENT DOCUMENTS

JP    2021-098912 A    7/2021
KR    101450604 B1    10/2014
(Continued)

OTHER PUBLICATIONS

Pdms for Leather; 2019; 3 pages. (Year: 2019).*
Machine translation of CN113737539A; Tao; Dec. 3, 2021; 14 pages. (Year: 2021).*

*Primary Examiner* — Linda L Gray
(74) *Attorney, Agent, or Firm* — Bridgeway IP Law Group, PLLC; Jihun Kim

(57) ABSTRACT

An artificial leather seat covering includes: a fabric, a binder layer, a skin layer, and a surface treatment layer, and a method for manufacturing the artificial leather seat covering comprises: preparing a base and a covering fabric; preparing a skin solution containing SiVi, SiH, and a vinyl silicone polymer; preparing a binder solution containing the SiVi, the SiH, and the vinyl silicone polymer; preparing a surface treatment solution containing the SiVi, the SiH, and the vinyl silicone polymer; applying the skin solution to the base to form a skin layer; applying the binder solution to one surface of the skin layer to form a binder layer; bonding the covering fabric to one surface of the binder layer; removing the base from the skin layer; and applying the surface treatment solution to one surface of the skin layer to form a surface treatment layer.

7 Claims, 3 Drawing Sheets

(51) Int. Cl.
  *C08G 77/12* (2006.01)
  *C09D 183/04* (2006.01)
  *D06N 3/12* (2006.01)
  *C08G 77/20* (2006.01)

(52) U.S. Cl.
  CPC ....... *B32B 2255/02* (2013.01); *B32B 2255/26* (2013.01); *B32B 2307/732* (2013.01); *B32B 2601/00* (2013.01); *C08G 77/12* (2013.01); *C08G 77/20* (2013.01); *D06N 2203/066* (2013.01)

(58) Field of Classification Search
  CPC .............. B32B 2307/732; D06N 3/128; D06N 2203/066; C09D 183/04; C08G 77/12; C08G 7/20
  USPC ........................................................ 156/329
  See application file for complete search history.

(56) References Cited

FOREIGN PATENT DOCUMENTS

| | | | |
|---|---|---|---|
| KR | 10-2017-0026147 | A | 3/2017 |
| KR | 10-2017-0066960 | A | 6/2017 |
| KR | 10-2020-0091134 | A | 7/2020 |
| WO | 2016093281 | A1 | 6/2016 |

* cited by examiner

| | Comparative Example | Example |
|---|---|---|
| planar abrasion | | |

|  | specimen image | color difference value ($\Delta E$) | |
|---|---|---|---|
| Comparative Example |  | contaminated state | 8.8 |
|  |  | decomtamination | 1.3 |
| Example |  | contaminated state | 3.8 |
|  |  | decomtamination | 0.6 |

FIG. 4

METHOD FOR MANUFACTURING ARTIFICIAL LEATHER SEAT COVERING

CROSS REFERENCE TO RELATED APPLICATION

The present application claims the benefit of Korean Patent Application No. 10-2021-0111399, filed on Aug. 24, 2021, which application is hereby incorporated herein by reference.

BACKGROUND OF THE INVENTION

1. Field of the Invention

The present disclosure relates to a method for manufacturing an artificial leather seat covering and, more specifically, to a method for manufacturing an artificial leather seat covering which is superb in terms of defense against contamination and durability against abrasion.

2. Description of the Prior Art

For vehicle seats, natural leather seats made from animal skins and artificial leather seats made artificially using polymer materials are used. Artificial leather is cheaper than natural leather and has the advantage of less deformation due to external environment compared to natural leather.

The most commonly used materials for artificial leather are polyvinyl chloride (PVC) and polyurethane (PU). However, there is a problem that a large amount of harmful substances are generated during the manufacturing process of artificial leather, and artificial leather made of the above materials is weak against contamination.

Recently, a technology for producing artificial leather using silicone has been introduced, but silicone has a problem in that it is difficult to satisfy the physical properties used in vehicles due to low adhesion, low abrasion strength, and low defense against contamination.

That is, there is a demand for a method of manufacturing artificial leather made of silicone material with improved adhesion, high abrasion strength, and improved antifouling performance in order to use the artificial leather made of silicone material as a vehicle seat.

The description given in the related art is only to understand the background of the present disclosure, but should not be recognized as a prior art already known to a person skilled in the art.

SUMMARY OF THE INVENTION

The present disclosure relates to a method for manufacturing an artificial leather seat covering usable as a vehicle seat and provides an artificial leather seat covering having improved abrasion strength and antifouling performance.

A method for manufacturing an artificial leather seat covering according to the present disclosure comprises the steps of:
preparing a base and a covering fabric;
preparing a skin solution containing SiVi represented by Chemical Formula 1, SiH represented by Chemical Formula 2, and a vinyl silicone polymer represented by Chemical Formula 3;
preparing a binder solution containing the SiVi, the SiH, and the vinyl silicone polymer;
preparing a surface treatment solution containing the SiVi, the SiH, and the vinyl silicone polymer;
applying the skin solution to the base to form a skin layer;
applying the binder solution to one surface of the skin layer to form a binder layer;
bonding the covering fabric to one surface of the binder layer;
removing the base from the skin layer; and
applying the surface treatment solution to one surface of the skin layer to form a surface treatment layer.

Chemical Formulas 1 to 3 are as follows:

[Chemical Formula 1]

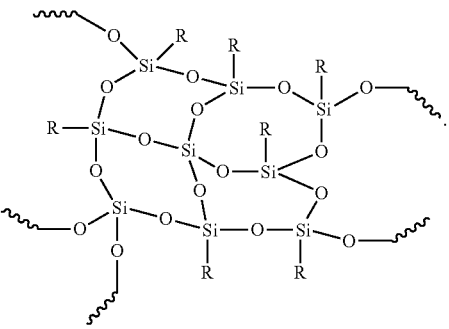

R = Me, OH, H

[Chemical Formula 2]

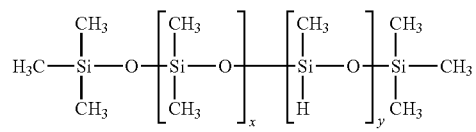

[Chemical Formula 3]

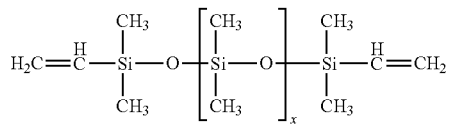

In the step of preparing a skin solution, 40-80 wt % of SiVi, 15-50 wt % of SiH, and 0.5-10 wt % of the vinyl silicone polymer may be mixed to prepare the skin solution.

In the step of preparing a skin solution, SiVi and SiH may be mixed at a weight ratio of 1:1.5-5.

In the preparing a binder solution, 15-30 wt % of SiVi, 5-20 wt % of SiH, and 50-70 wt % of the vinyl silicone polymer are mixed to prepare the binder solution.

In the preparing a surface treatment solution, 40-80 wt % of SiVi, 15-50 wt % of SiH, and 0.5-10 wt % of the vinyl silicone polymer are mixed to prepare the surface treatment solution.

The surface treatment layer may include PDMS represented by the following Chemical Formula 4:

[Chemical Formula 4]

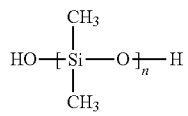

In the step of forming a skin layer, the skin solution may be heated at 100° C. to 200° C. to form the skin layer in a semi-cured state.

In one of the steps of preparing a skin solution, a binder solution, and a surface treatment solution, a platinum or zirconium catalyst may be used.

The covering fabric may be 800-850 μm thick, the skin layer may be 60-75 μm thick, the binder layer may be 80-160 μm thick, and the surface treatment layer may be 1-5 μm thick.

BRIEF DESCRIPTION OF THE DRAWINGS

The above and other aspects, features and advantages of the present disclosure will be more apparent from the following detailed description taken in conjunction with the accompanying drawings, in which:

FIG. 4 shows results of an assay for antifouling performance.

DETAILED DESCRIPTION OF THE EXEMPLARY EMBODIMENTS

Hereinafter, embodiments of the present disclosure will be described in detail in conjunction with the accompanying drawings. However, the present disclosure is not limited to embodiments that will be disclosed below and may be implemented in various different forms. These embodiments are merely provided to make the disclosure of the present disclosure complete and to enable those having ordinary knowledge in the art to which the present disclosure pertains completely understand the scope of the present disclosure.

A method for manufacturing an artificial leather seat covering according to the present disclosure is characterized by using a silicone compound in manufacturing an artificial leather seat covering.

Figure 1:
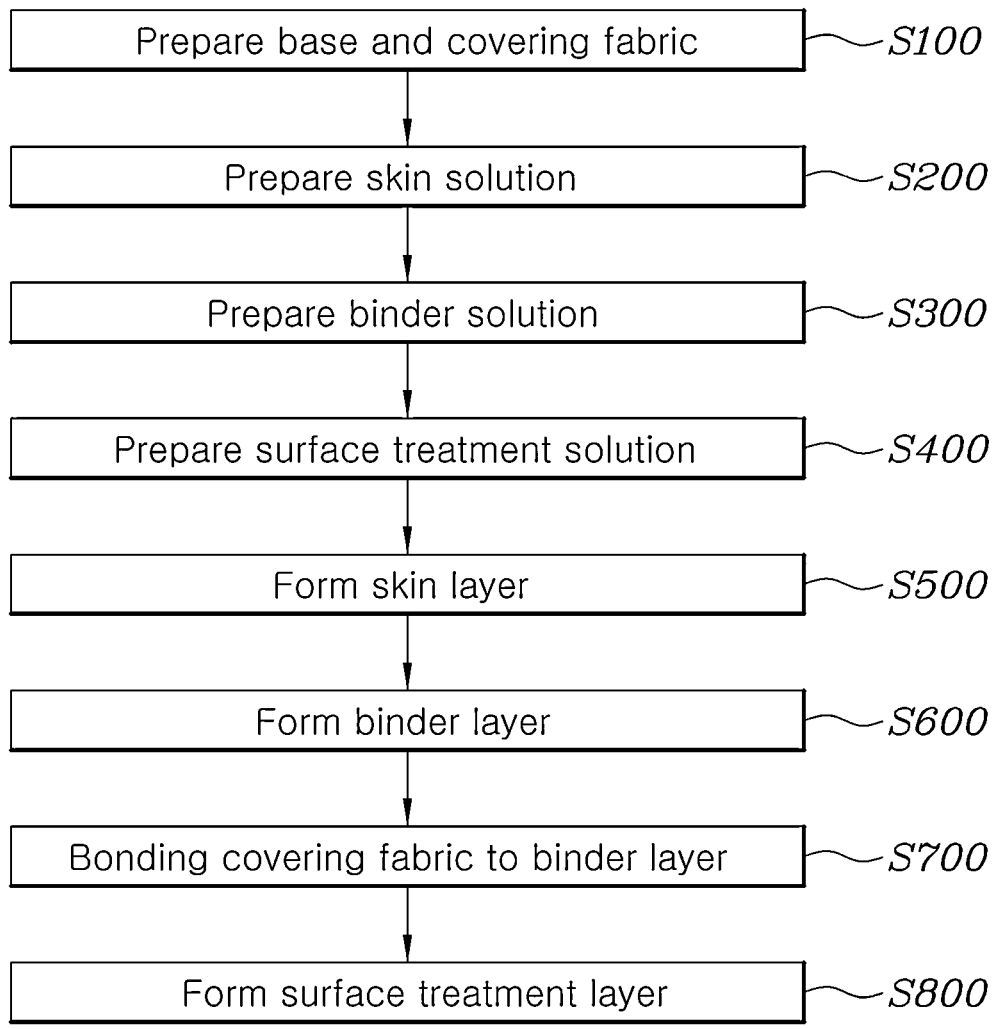
FIG. 1 is a flow chart of a manufacturing method for an artificial leather seat covering.

FIG. 1 is a flow chart of a manufacturing method for an artificial leather seat covering. The method for manufacturing an artificial leather seat covering will be explained in detail. First, the overall scheme of the method for manufacturing an artificial leather seat covering is as follows.

Figures 2, 3:
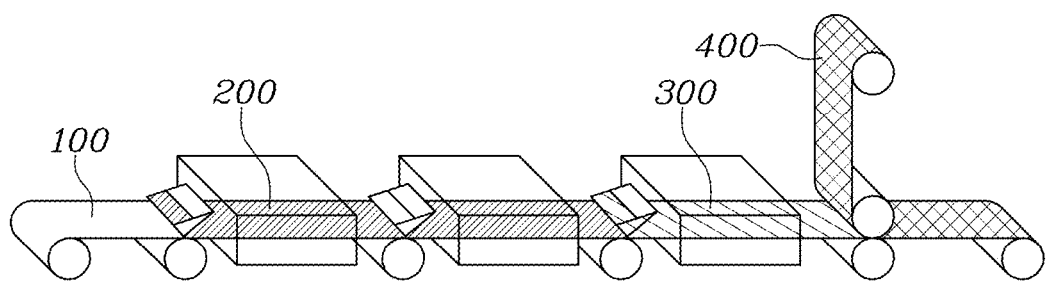
FIG. 2 is a schematic illustration of a process of bonding a skin layer, a binder layer, and a covering fabric in the method for manufacturing an artificial leather seat covering.
FIG. 3 shows photographic images of specimens after an assay for abrasion strength.

With reference to FIG. 2, in the method for manufacturing an artificial leather seat covering, a base 100 is coated with a skin layer 200 on one surface of which a binder layer 300 is formed, followed by attachment of a prepared covered fabric 400 to the binder layer 300. Then, the base is removed from the skin layer and a surface treatment layer (not shown) is formed on the exposed surface of the skin layer.

In the step of preparing a base and a covering fabric (S100), a base 100 on which a skin layer 200 will be formed, and a covering fabric 400 are prepared. The covering fabric 400 may be made by interlacing 100-150 denier yarns, 20 to 30 denier 10-15 filament high-shrink yarns, and 60 to 75 denier 134-144 filament yarns.

Subsequently, a skin solution, a binder solution, and a surface treatment solution, each containing SiVi represented by Chemical Formula 1, SiH represented by Chemical Formula 2, and the vinyl silicone polymer represented by Chemical Formula 3, are prepared. All the skin solution, the binder solution, and the surface treatment solution are prepared by mixing SiVi, SiH, and vinyl silicone polymer, but at different ratios.

Chemical Formulas 1 to 3 are as follows, wherein x and y are each an integer varying depending on molecular weights.

[Chemical Formula 1]

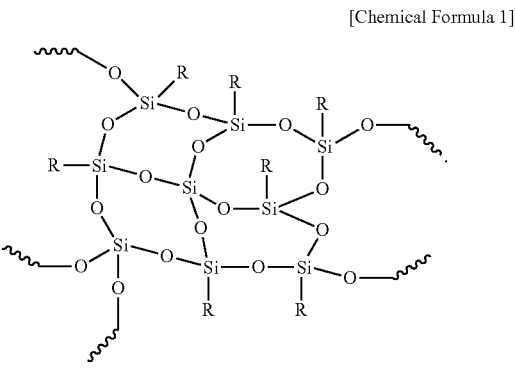

R = Me, OH, H

[Chemical Formula 2]

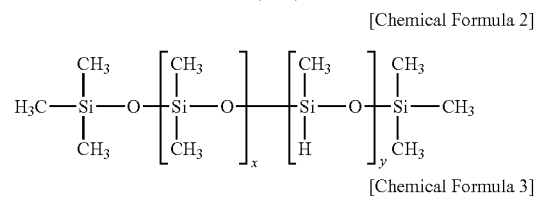

[Chemical Formula 3]

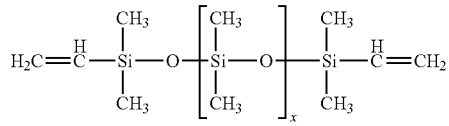

After the covering fabric 400, the base 100, and the solutions are all prepared, the skin solution is applied to the base 100 to form a skin layer 200. In the step of preparing a skin layer (S500), the skin solution is heated at 100° C. to 200° C. to form a skin layer in a semi-cured state. If the skin layer is completely cured as SiVi and SiH are reacted with each other, the surface of the skin layer 200 becomes dry. When the skin layer 200 is formed in a semi-cured state, with SiVi and SiH remaining partially unreacted, the interface of the skin layer 200 is sticky and has further strengthened adhesive force with the binder solution.

Then, the binder solution is applied to one surface of the skin layer 200 to form a binder layer 300.

Subsequently, the covering fabric 400 is attached to one surface of the binder layer 300.

Thereafter, the base 100 is removed and the surface treatment solution is applied to the exposed surface of the skin layer 200 to form a surface treatment layer.

Thus, the manufacture of the artificial leather seat covering according to an embodiment of the present invention is completed.

In each solution, concrete mixing ratios of SiVi, SiH, and Vinyl Silicone Polymer are as follows.

The skin solution may be prepared by mixing SiVi, SiH, and 0.5-10 wt % of Vinyl Silicone Polymer. In addition, SiVi and SiH are particularly mixed at a weight ratio of 1:1.5-5.

TABLE 1

| SiH/Vi | 1.23 | 1.51 | 1.73 | 2.16 | 2.17 | 2.59 | 3.02 | 4.55 | 5.48 |
|---|---|---|---|---|---|---|---|---|---|
| Hardness(Shore A) | 29 | 30 | 29 | 34 | 34 | 35 | 35 | 34 | 42 |
| Tensile(Mpa) | 5.55 | 5.1 | 4.96 | 4.62 | 4.22 | 3.79 | 3.28 | 3.61 | 3.25 |
| Elongation(%) | 705.47 | 646.1 | 632.12 | 561.7 | 466.28 | 464.9 | 403.6 | 335.3 | 305.5 |
| Tear (kN/m) | 28.48 | 21.82 | 25.174 | 20.918 | 21.124 | 21.006 | 16.024 | 18.46 | 16.02 |

Referring to Table 1, when SiVi and SiH are mixed at a ratio of 1:1.23, poor abrasion strength is obtained due to the low hardness. At a mixing ratio of 1:5.48 of SiVi and SiH, the covering has low tensile and elongation values and thus is weak in resistance to flexure. When undergoing surface cracking or receiving a tensile strength, the covering may be torn and become poor in durability. Therefore, the mixing ratio of SiVi and SiH is most particularly in the range of 1:1.5 to 5.

In the step of preparing a binder solution (S300), 15-30 wt % of SiVi, 5-20 wt % of SiH, 50-70 wt % of the vinyl silicone polymer may be mixed. Additionally, a platinum or zirconium catalyst may be fed in the step of preparing a binder solution. In the presence of a zirconium catalyst, a condensation ration is induced in the binder solution so that the adhesive force of the binder layer can be improved to 2.3 kg/cm.

In the step of preparing a surface treatment solution (S400), 40-80 wt % of SiVi, 15-50 wt % of SiH, 0.5-10 wt % of the Vinyl Silicone Polymer may be mixed to prepare the surface treatment solution. The surface treatment layer formed by applying the surface treatment solution to one surface of the skin layer contains PDMS generated through the following mechanism.

[Mechanism]

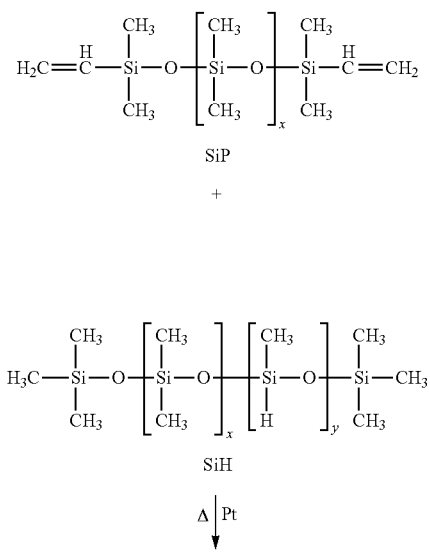

SiP

+

SiH

Δ ↓ Pt

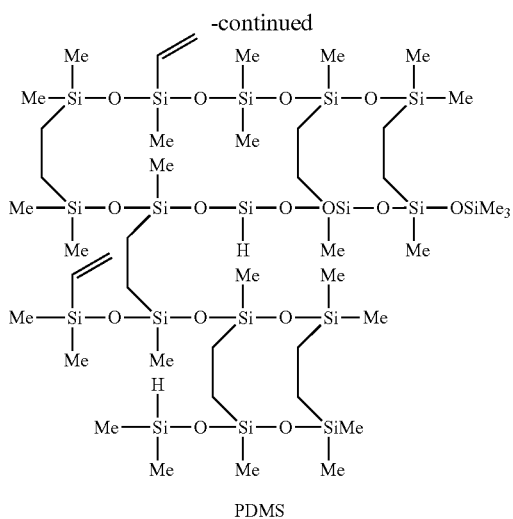

PDMS

The artificial leather seat covering thus manufactured contains the skin layer, the binder layer, and the surface treatment layer which range in thickness from 60 to 75 m, from 80 to 160 m, and from 1 to 5 respectively, with the covering fabric 800-850 μm thick.

The polymerization reaction of SiVi and SiH results in the formation of artificial leather including Si. The artificial leather has high releasability due to the low surface energy (18-23 dynes/cm) of silicone itself, and exhibits excellent antifouling performance (a surface energy of about 38 dynes/cm for the conventional material polyurethane).

In addition, the mutual polymerization among SiVi, SiH, and the vinyl silicone polymer is considered to increases a crosslink density, resulting in an improvement in wear resistance.

Artificial leather seat coverings are manufactured according to the following Example and Comparative Example and evaluated for antifouling performance and abrasion strength.

Example: Manufacture of Artificial Leather Seat Covering

Covering fabric was made by interlacing 150-denier yarns, 30-denier 12-filament high-shrink yarns, and 75-denier 144-filament yarns.

Skin solution: ViSi, SiH, and vinyl silicone polymer were mixed in respective amounts of 30 wt %, 60 wt %, and 8 wt %, along with 2 wt % of platinum and zirconium catalysts.

Binder solution: ViSi, SiH, and vinyl silicone polymer were mixed in respective amounts of 15 wt %, 30 wt %, and 53 wt %, along with 2 wt % of platinum and zirconium catalysts.

Surface treatment solution: ViSi, SiH, and vinyl silicone polymer were mixed in respective amounts of 60 wt %, 28 wt %, and 10 wt %, along with 2 wt % of platinum and zirconium catalysts.

The skin solution was applied to a base and heated at 150° C. to form a skin layer in a semi-cured state. Then, the binder solution was applied to one surface of the skin layer to form a binder layer to which the covering fabric was bonded.

Subsequently, the base was removed from the skin layer which was then coated with the surface treatment solution which was thermally cured at 150° C. As a result, an artificial leather seat covering was manufactured.

Comparative Example: Manufacture of Artificial Leather Seat Covering

The same covering fabric as in the Example was used.

Skin solution: ViSi, SiH, and vinyl silicone polymer were mixed in respective amounts of 35 wt %, 52.5 wt %, and 10 wt %, along with 2.5 wt % of platinum and zirconium catalysts.

Binder solution: ViSi, SiH, and vinyl silicone polymer were mixed in respective amounts of 20 wt %, 30 wt %, and 48 wt %, along with 2.5 wt % of platinum and zirconium catalysts.

Surface treatment solution: a typically used silicone surface agent

The skin solution was applied to a base and heated at 200° C. to form a skin layer in a cured state. Then, the binder solution was applied to one surface of the skin layer to form a binder layer to which the covering fabric was bonded.

Subsequently, the base was removed from the skin layer which was then coated with the surface treatment solution which was thermally cured at 150° C. As a result, an artificial leather seat covering was manufactured.

<Assay for Abrasion Strength>

The assay for abrasion strength is to evaluate surface abrasion and injured states of the artificial leather seat covering and was conducted according to an in-lab protocol.

Specimens were observed for surface abrasion condition after being fractional 20,000 times with a Velcro hook on a friction ruler having a weight of 4.5 kgf.

FIG. 3 shows assay results for abrasion strength. As shown, the surface of the specimen according to the Comparative Example was observed to be seriously worn after 300 rounds of fractioning whereas the surface of the specimen according to the Example remained normal.

<Assay for Antifouling Performance>

Antifouling performance was assayed according to ISO 5470 for measuring contamination resistance with denim.

i) Measurement of Contamination

First, the specimens of the Comparative Example and the Example were fixed, followed by applying of a contaminating fabric to the surface thereof. After 1,000 rounds of contamination, the specimens were dried at 80° C. for 2 hours. A color difference value was measured three times at the part within 10 mm from the contaminated edge and an average of the measurements was calculated.

ii) Decontamination

The contaminated specimens of the Comparative Example and the Example were rubbed gently at a pressure of 50 kPa with a detergent-soaked white fabric. This procedure was repeated with new white fabrics until no contaminations were found in the while fabric.

FIG. 4 shows results from an assay for antifouling performance. As shown, the color difference value of the Comparative Example was measured to be 8.8 in a contaminated state and decreased to 1.3 after decontamination. For the Example, the color difference value was 3.8 in the contaminated state, which is lower than that of the Comparative Example, and decreased to 0.6 after decontamination, indicating that the Example is easy to decontaminate.

As described hitherto, the artificial leather seat covering manufactured according to the manufacturing method of the present disclosure has excellent antifouling performance and high abrasion strength and as such, is suitable for use as a vehicle seat covering.

It will be appreciated by those having ordinary knowledge in the art to which the present disclosure pertains that the present invention may be practiced in other specific forms without changing the technical spirit and essential features of the present disclosure. Therefore, it should be understood that the above-described embodiments are illustrative but not restrictive in all aspects. The scope of the present disclosure is defined by the scope of the attached claims, rather than the detailed description. It should be appreciated that all variations and modifications derived from the scope of the claims and the equivalent concepts thereof are included in the scope of the present disclosure.

What is claimed is:

1. A method for manufacturing an artificial leather seat covering comprises:
    preparing a base and a covering fabric;
    preparing a skin solution containing SiVi represented by Chemical Formula 1, SiH represented by Chemical Formula 2, and a vinyl silicone polymer represented by Chemical Formula 3, wherein x and y are each an integer varying depending on molecular weights;
    preparing a binder solution containing the SiVi, the SiH, and the vinyl silicone polymer;
    preparing a surface treatment solution containing the SiVi, the SiH, and the vinyl silicone polymer;
    applying the skin solution to the base to form a skin layer;
    applying the binder solution to one surface of the skin layer to form a binder layer;
    bonding the covering fabric to one surface of the binder layer;
    removing the base from the skin layer; and
    applying the surface treatment solution to one surface of the skin layer to form a surface treatment layer,
    wherein the skin solution is prepared by mixing the SiVi, the SiH, and the vinyl silicone polymer at a first ratio, the binder solution is prepared by mixing the SiVi, the SiH, and the vinyl silicone polymer at a second ratio, and the surface treatment solution is prepared by mixing the SiVi, the SiH, and the vinyl silicone polymer at a third ratio, wherein the first, second, and third ratios are different from one another, and
    wherein, in the preparing of the skin solution, the SiVi and the SiH are mixed at a weight ratio of 1:1.5 to 5,

[Chemical Formula 1]

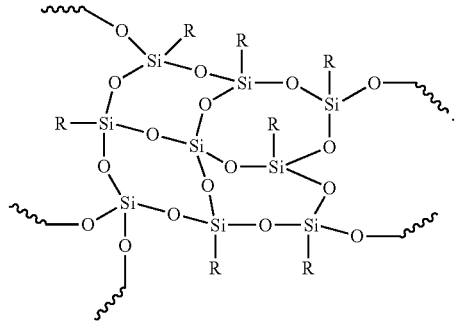

R = Me, OH, H

-continued

[Chemical Formula 2]

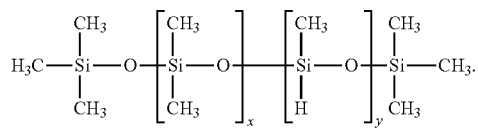

[Chemical Formula 3]

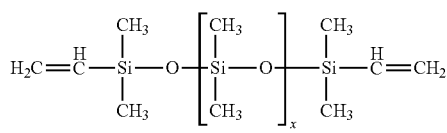

2. The method of claim 1, wherein, in the preparing of the binder solution, 15-30 wt % of the SiVi, 5-20 wt % of the SiH, and 50-70 wt % of the vinyl silicone polymer are mixed to prepare the binder solution.

3. The method of claim 1, wherein, in the preparing the surface treatment solution, 40-80 wt % of the SiVi, 15-50 wt % of the SiH, and 0.5-10 wt % of the vinyl silicone polymer are mixed to prepare the surface treatment solution.

4. The method of claim 1, wherein, in the forming of the skin layer, the skin solution is heated at 100° C. to 200° C. to form the skin layer in a semi-cured state.

5. The method of claim 1, wherein one of the preparing of the skin solution, the preparing of the binder solution, and the preparing of the surface treatment solution employs a platinum or zirconium catalyst.

6. An artificial leather seat covering, manufactured by a method comprising:
preparing a base and a covering fabric;
preparing a skin solution containing SiVi represented by Chemical Formula 1, SiH represented by Chemical Formula 2, and a vinyl silicone polymer represented by Chemical Formula 3, wherein x and y are each an integer varying depending on molecular weights;
preparing a binder solution containing the SiVi, the SiH, and the vinyl silicone polymer;
preparing a surface treatment solution containing the SiVi, the SiH, and the vinyl silicone polymer;
applying the skin solution to the base to form a skin layer;
applying the binder solution to one surface of the skin layer to form a binder layer;
bonding the covering fabric to one surface of the binder layer;
removing the base from the skin layer; and
applying the surface treatment solution to one surface of the skin layer to form a surface treatment layer,
wherein the skin solution is prepared by mixing the SiVi, the SiH, and the vinyl silicone polymer at a first ratio, the binder solution is prepared by mixing the SiVi, the SiH, and the vinyl silicone polymer at a second ratio, and the surface treatment solution is prepared by mixing the SiVi, the SiH, and the vinyl silicone polymer at a third ratio, wherein the first, second, and third ratios are different from one another, and
wherein, in the preparing of the skin solution, the SiVi and the SiH are mixed at a weight ratio of 1:1.5 to 5,

[Chemical Formula 1]

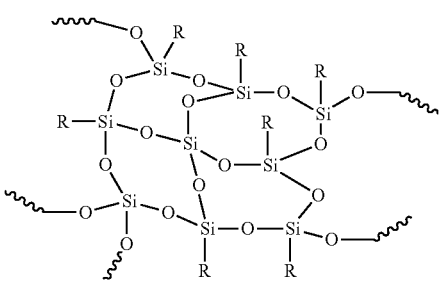

R = Me, OH, H

[Chemical Formula 2]

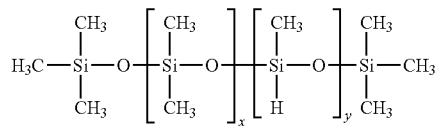

[Chemical Formula 3]

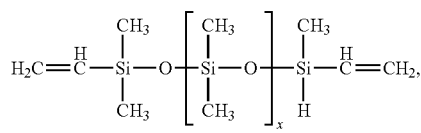

wherein the artificial leather seat covering comprises:
the covering fabric;
the binder layer;
the skin layer; and
the surface treatment layer.

7. The artificial leather seat covering of claim 6, wherein the covering fabric is 800-850 μm thick, the skin layer is 60-75 μm thick, the binder layer is 80-160 μm thick, and the surface treatment layer is 1-5 μm thick.

* * * * *